Sept. 1, 1925.  
G. NAISMITH  
HEATING FURNACE  
Filed May 21, 1925  
1,552,225  
3 Sheets-Sheet 1
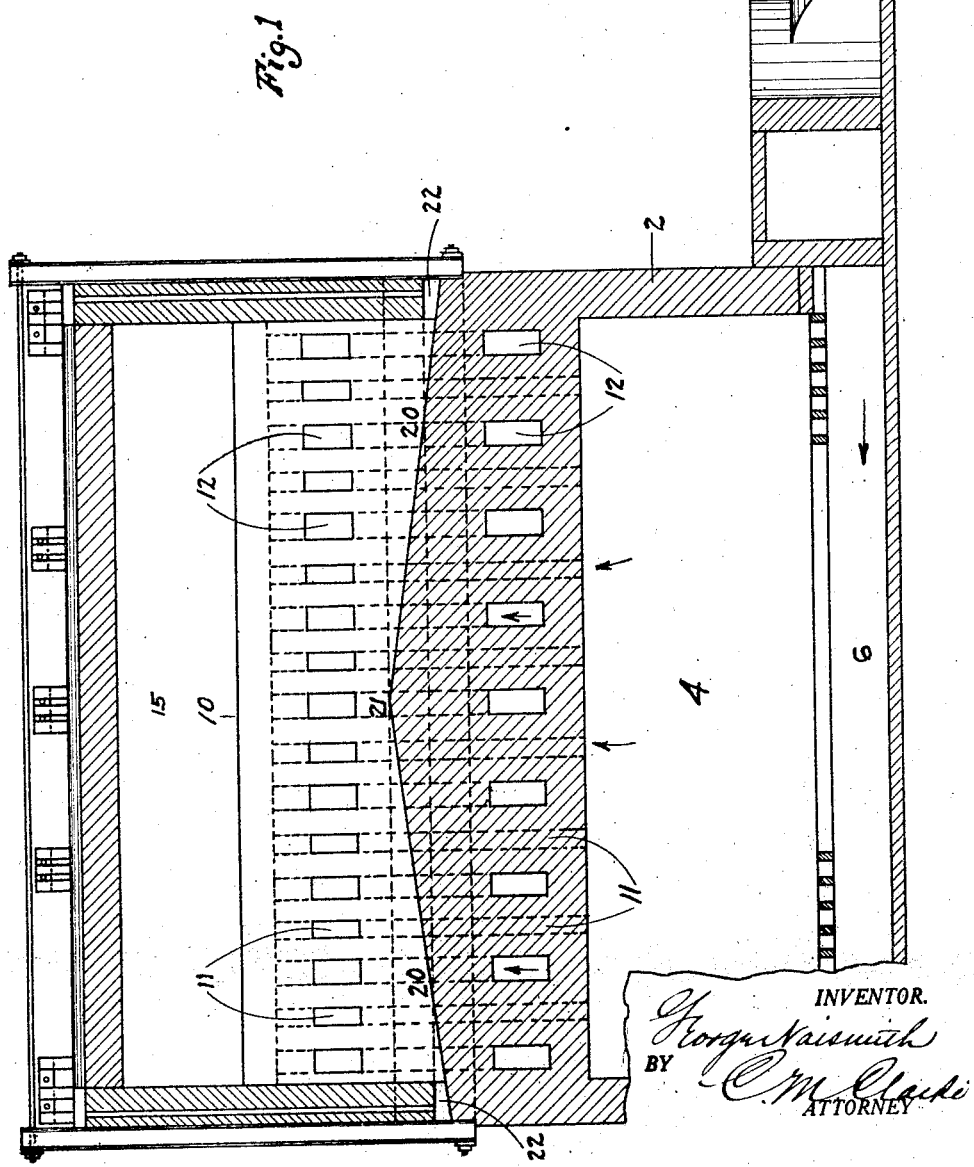

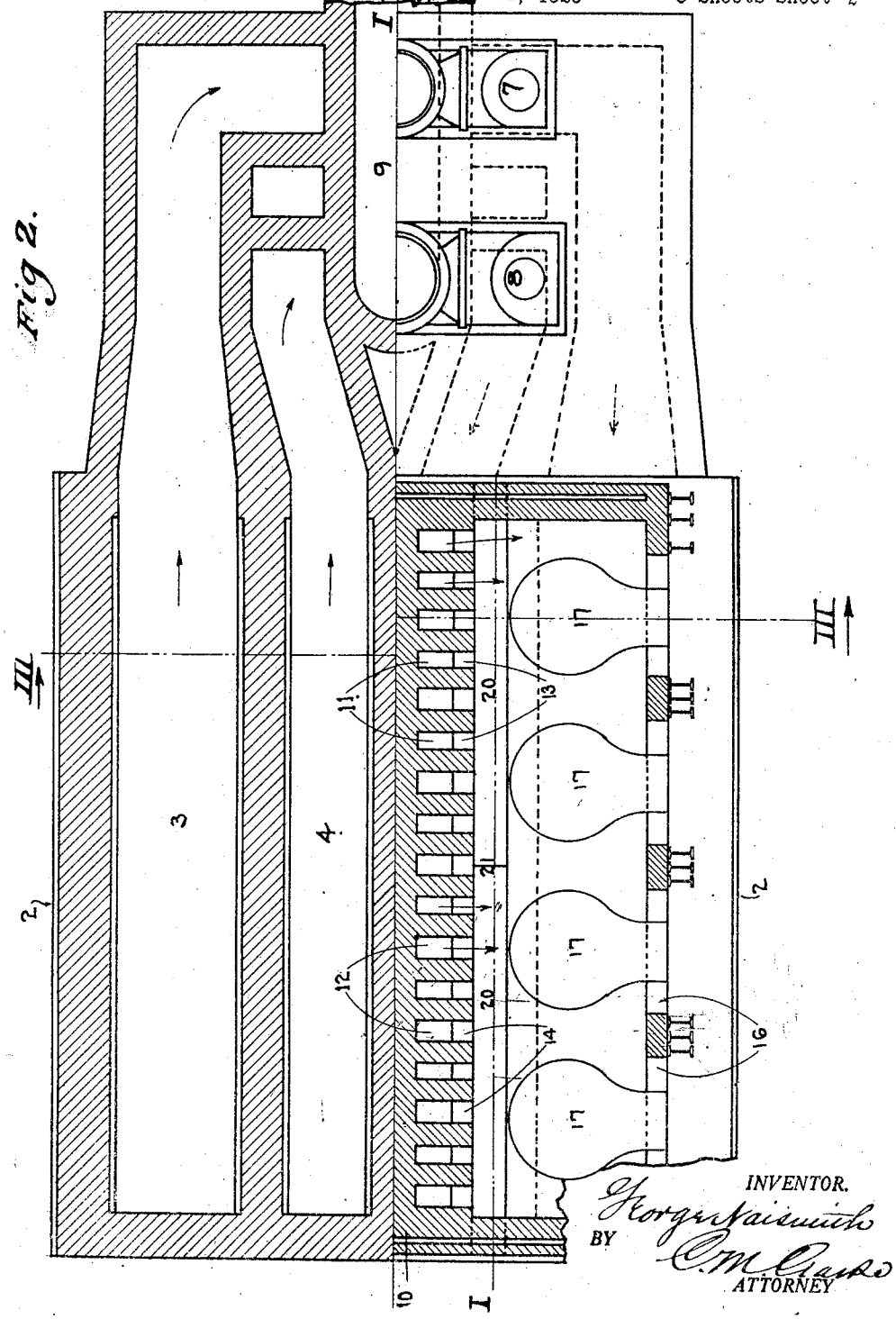

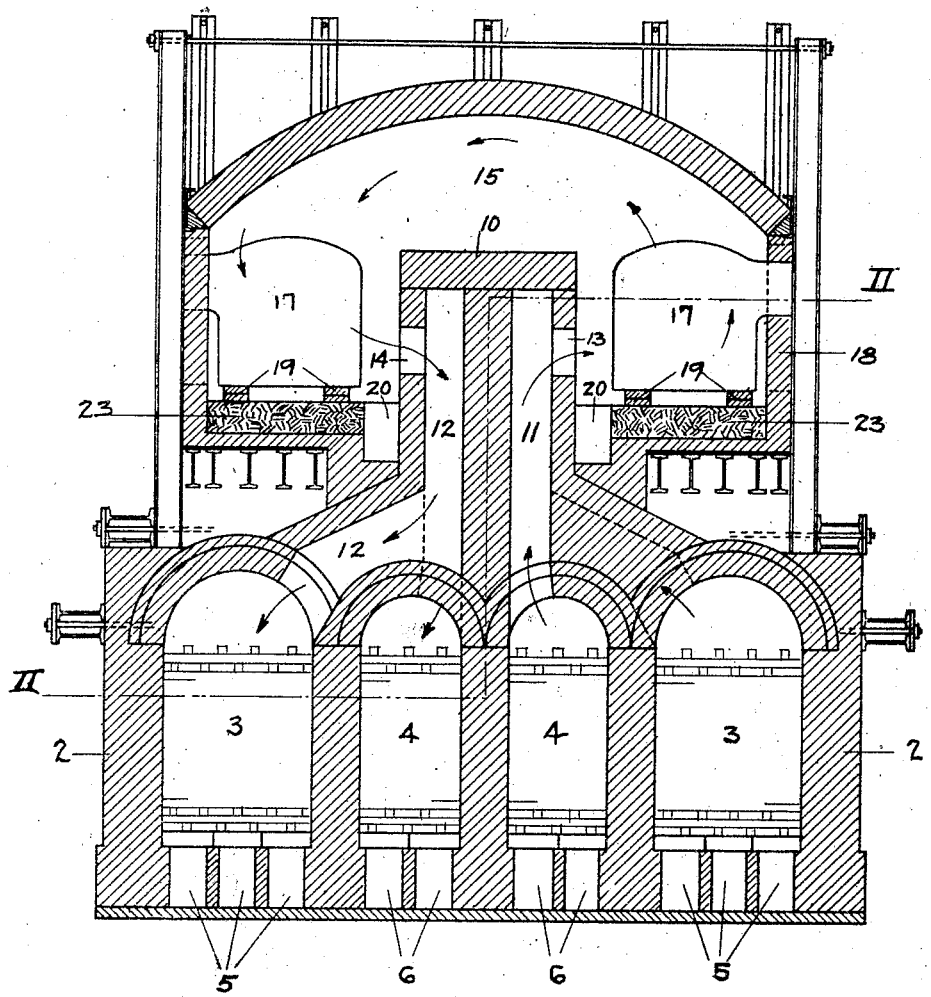

Patented Sept. 1, 1925.

1,552,225

UNITED STATES PATENT OFFICE.

GEORGE NAISMITH, OF ASPINWALL, PENNSYLVANIA.

HEATING FURNACE.

Application filed May 21, 1925. Serial No. 31,757.

*To all whom it may concern:*

Be it known that I, GEORGE NAISMITH, a citizen of the United States, residing at Aspinwall, in the county of Allegheny and State of Pennsylvania, have invented certain new and useful Improvements in Heating Furnaces, of which the following is a specification.

My invention is an improvement in the class of regenerative furnaces, and is particularly designed as a pot furnace for melting glass.

It has for its object to provide a common heating chamber for the combustion of gaseous fuel in such manner that oppositely arranged pots shall be at all times subjected to the surrounding heat, due to the circulation and arrangement of the flues and other portions of the furnace. As shown, the pots are located at opposite sides of the combustion chamber, while the incoming gas and air are alternately introduced from one side and the other of a middle flue or port structure with corresponding alternation of the outgoing gases, and under the control of the usual Siemens valves.

In the drawings showing one preferred embodiment of the invention:—

Figure 1 is a longitudinal vertical section of the furnace on the line 1, 1, of Fig. 2.

Figure 2 is a horizontal section on the broken planes indicated by the line 11, 11, of Fig. 3, but showing one half of the valve construction in plan.

Figure 3 is a cross section on the broken line 111, 111, of Fig. 2.

The foundation structure 2 is of standard regenerative practice and construction, providing the air regenerative chambers 3, 3, and the gas regenerative chambers 4, 4, having the usual checkerwork and in communication with the flues 5, 5, and 6, 6, leading to and from air valve 7 and gas valves 8. A waste conduit 9 leads to the usual stack, as is generally understood.

Midway above the regenerative chambers is a central air and gas distributing block or wall structure 10 adapted to distribute heated gas and air to one side or the other by means of vertical gas ports 11 communicating with gas chambers 4 and similar air ports 12, communicating with air chambers 3. Said ports alternate lengthwise of the block 10 and communicate with similarly alternating delivery ports 13 and 14. These latter ports deliver gas and air horizontally towards one side of the heating chamber 15 while the corresponding set of ports at the other side are receiving waste gases, and vice versa, the circulation alternating with reversal of the valves 7 and 8.

Thus, with valves 7 and 8 in position to deliver gas and air through ports 13 and 14 at one side of the entire length of the distributing block 9, with resulting combustion thereof in chamber 15, the products of combustion as waste gases will pass inwardly through the corresponding ports at the other side, downwardly through flues 11 and 12, reheating the checkerwork in chambers 3 and 4, and passing to the stack.

The combustion in chamber 15 will be continuous, alternating in direction of flow of the gases from one side of the chamber to the other in a circular course, with each alternation of the valves, in the manner generally practiced.

The furnace is provided at each side with openings 16 for introduction of the glass melting pots 17, which openings are walled in around the open spout of each pot, when placed, as at 18.

For such purpose the locations are spaced and the furnace is proportioned as to its main dimensions to suitably receive the desired number at each side, and with ample intervening space for free circulation of the gases in combustion. By such arrangement, all portions of the pots are exposed to the heating action of the gases in an economical effective manner.

The pots are also supported above the floor, for the same purpose, by blocks or spaced piers 19 of refractory material, leaving intervening circulation space, so as to heat the bottom of the pot.

For the purpose of carrying off melted glass, etc. in case of pot breakage, a longitudinal gutter or channel 20 is located lengthwise of the main chamber 15 at each side of the block 10, as shown. Such gutter tapers downwardly towards each end of the furnace, from a middle high point 21, so as to deliver any such fluid accumulation by gravity flow through terminal openings 22 at each end.

The floor 23 may be of either clay or brick as desired, and may be flat as shown, or slightly tapered inwardly, to assist in delivery to the main delivery gutters 20.

The construction and operation of the furnace will be readily understood from the foregoing description. It will be obvious that the brickwork, arches, and other portions of the construction will be suitably braced and reinforced by the usual back staves and other features according to good practice. The proportions of the furnace should conform to the standard sizes and desired spacing of the pots, and these or other details of construction are within the judgment and province of the designing engineer or builder.

The furnace may therefore be changed or varied in different features or details, but all such are to be understood as within the scope of the following claims.

What I claim is:—

1. A regenerative furnace of the class described provided with a centrally arranged wall structure having air and gas supply and return ports opening in opposite directions to the interior of the enclosed heating chamber.

2. A regenerative furnace of the class described provided with standard air and gas regenerative chambers and controlling valves therefor, an upper heating chamber within surrounding walls and a roof, and a middle upwardly extending fuel delivery structure having ports communicating with the regenerative chambers and opening on opposite sides to the interior of the heating chamber.

3. A regenerative heating furnace having in its base air and gas regenerative chambers and controlling valves therefor, an upper heating chamber within surrounding walls and a roof, and a middle longitudinal upwardly extending fuel delivery structure provided with downwardly extending ports leading to and from the respective regenerative chambers and having outwardly deflected delivery and receiveing ports at opposite sides of the fuel delivery structure.

4. In combination with a base foundation portion incorporating a series of air and gas regenerative chambers and means controlling circulation therethrough, a superimposed heating chamber having a hearth along each side thereof, apertured side walls, end walls, and a roof, and a middle longitudinal upwardly extending fuel delivery structure provided with ports leading from and to the respective regenerative chambers and having oppositely deflected delivery and receiving ports opening into the heating chamber and providing for transverse circulation therethrough.

5. In combination with a series of regenerative chambers and a middle upwardly extending fuel delivery structure having ports communicating with said chambers and opening laterally at opposite sides thereof, an upper heating chamber surrounding said structure provided with a supporting hearth at each side within surrounding walls and a roof, and provided with inclined channels leading to the outside of the heating chamber.

6. A glass pot heating furnace as described having a middle fuel supply structure provided with ports opening towards each side wall whereby to provide circulation of the gases in combustion through the heating chamber, a hearth along each opposite side of the heating chamber, and side walls having openings adapted to provide for placement of pots on the hearth.

7. A glass pot heating furnace as described having a middle fuel supply structure provided with ports opening towards each side wall whereby to provide circulation of the gases in combustion through the heating chamber, a hearth along each opposite side of the heating chamber, an inclined gutter between each hearth and the fuel supply structure sloping downwardly from the middle towards each end of the heating chamber, and side walls having openings adapted to provide for placement of pots on the hearth.

In testimony whereof I hereunto affix my signature.

GEORGE NAISMITH.